(12) United States Patent
Yuan et al.

(10) Patent No.: US 12,556,905 B2
(45) Date of Patent: Feb. 17, 2026

(54) USER EQUIPMENT CAPABILITY INDICATION FOR UPLINK TRANSMISSION CONFIGURATION INDICATION STATE AND SPATIAL RELATION INFORMATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/758,237

(22) PCT Filed: Feb. 7, 2020

(86) PCT No.: PCT/CN2020/074494
§ 371 (c)(1),
(2) Date: Jun. 30, 2022

(87) PCT Pub. No.: WO2021/155566
PCT Pub. Date: Aug. 12, 2021

(65) Prior Publication Data
US 2023/0027791 A1   Jan. 26, 2023

(51) Int. Cl.
*H04W 8/22*      (2009.01)
*H04W 16/28*     (2009.01)
*H04W 76/20*     (2018.01)

(52) U.S. Cl.
CPC ............. *H04W 8/22* (2013.01); *H04W 16/28* (2013.01); *H04W 76/20* (2018.02)

(58) Field of Classification Search
CPC ....... H04W 8/22; H04W 16/28; H04W 76/20; H04W 8/24; H04L 5/0048; H04L 5/0023;
(Continued)

(56) References Cited

U.S. PATENT DOCUMENTS

2019/0141693 A1   5/2019  Guo et al.
2019/0373450 A1   12/2019 Zhou et al.
(Continued)

FOREIGN PATENT DOCUMENTS

| CN | 109315009 A | 2/2019 |
| CN | 109983797 A | 7/2019 |
| CN | 110475263 A | 11/2019 |

OTHER PUBLICATIONS

International Search Report and Written Opinion—PCT/CN2020/074494—ISA/EPO—Oct. 27, 2020.
(Continued)

*Primary Examiner* — Peter P Chau
(74) *Attorney, Agent, or Firm* — Harrity & Harrity, LLP (57) ABSTRACT

Various aspects of the present disclosure generally relate to wireless communication. In some aspects, a user equipment (UE) may transmit, and a base station may receive, information indicating that the UE has a capability to support an uplink transmission configuration indication (TCI) state. The base station may transmit, and the UE may receive, downlink signaling identifying an uplink transmit beam based at least in part on the information indicating that the UE has the capability to support the uplink TCI state. The UE may transmit, and the base station may receive, uplink information using the uplink transmit beam identified in the downlink signaling. Numerous other aspects are provided.

14 Claims, 5 Drawing Sheets

(58) Field of Classification Search
CPC ... H04L 5/0053; H04B 7/0404; H04B 7/0628; H04B 7/0695
See application file for complete search history.

(56) References Cited

U.S. PATENT DOCUMENTS

| | | | | |
|---|---|---|---|---|
| 2019/0387547 | A1* | 12/2019 | Shin | H04W 74/0866 |
| 2021/0044343 | A1* | 2/2021 | Onggosanusi | H04B 7/063 |
| 2021/0127399 | A1 | 4/2021 | Kou et al. | |
| 2021/0136741 | A1* | 5/2021 | Onggosanusi | H04W 72/23 |
| 2021/0352646 | A1 | 11/2021 | Li | |
| 2022/0123818 | A1 | 4/2022 | Li | |
| 2022/0345272 | A1* | 10/2022 | Guo | H04W 72/20 |
| 2023/0008939 | A1* | 1/2023 | Gao | H04L 5/0048 |

OTHER PUBLICATIONS

VIVO: "Remaining Details on Beam Measurement and Reporting," 3GPP TSG RAN WG1 Meeting #91, R1-1719769, Reno, USA, Nov. 27-Dec. 1, 2017 (Dec. 1, 2017), the whole document, 8 pages.
Supplementary European Search Report—EP20917543—Search Authority—Munich—Sep. 28, 2023.

* cited by examiner

USER EQUIPMENT CAPABILITY INDICATION FOR UPLINK TRANSMISSION CONFIGURATION INDICATION STATE AND SPATIAL RELATION INFORMATION

CROSS-REFERENCE TO RELATED APPLICATION

This application is a 371 national stage of Patent Cooperation Treaty (PCT) Application No. PCT/CN2020/074494 filed on Feb. 7, 2020, entitled "USER EQUIPMENT CAPABILITY INDICATION FOR UPLINK TRANSMISSION CONFIGURATION INDICATION STATE AND SPATIAL RELATION INFORMATION," which is hereby expressly incorporated by reference herein.

FIELD OF THE DISCLOSURE

Aspects of the present disclosure generally relate to wireless communication and to techniques and apparatuses for user equipment (UE) indication for uplink transmission configuration indication (TCI) state and spatial relation information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: transmitting, to a base station, information indicating that the UE has a capability to support an uplink transmission configuration indication (TCI) state; receiving, from the base station, downlink signaling identifying an uplink transmit beam based at least in part on the information indicating that the UE has the capability to support the uplink TCI state; and transmitting, to the base station, uplink information using the uplink transmit beam identified in the downlink signaling.

In some aspects, a method of wireless communication, performed by a base station, may include: receiving, from a UE, information indicating that the UE has a capability to support an uplink TCI state; transmitting, to the UE, downlink signaling identifying an uplink transmit beam based at least in part on the information indicating that the UE has the capability to support the uplink TCI state; and receiving, from the UE, uplink information using an uplink receive beam corresponding to the uplink transmit beam identified in the downlink signaling.

In some aspects, a UE for wireless communication may include a memory and one or more processors operatively coupled to the memory. The memory and the one or more processors may be configured to: transmit, to a base station, information indicating that the UE has a capability to support an uplink TCI state; receive, from the base station, downlink signaling identifying an uplink transmit beam based at least in part on the information indicating that the UE has the capability to support the uplink TCI state; and transmit, to the base station, uplink information using the uplink transmit beam identified in the downlink signaling.

In some aspects, a base station for wireless communication may include a memory and one or more processors operatively coupled to the memory. The memory and the one or more processors may be configured to: receive, from a UE, information indicating that the UE has a capability to support an uplink TCI state; transmit, to the UE, downlink signaling identifying an uplink transmit beam based at least in part on the information indicating that the UE has the capability to support the uplink TCI state; and receive, from the UE, uplink information using an uplink receive beam corresponding to the uplink transmit beam identified in the downlink signaling.

In some aspects, a non-transitory computer-readable medium may store one or more instructions for wireless communication. The one or more instructions, when executed by one or more processors of a UE, may cause the one or more processors to: transmit, to a base station, information indicating that the UE has a capability to support an uplink TCI state; receive, from the base station, downlink signaling identifying an uplink transmit beam based at least in part on the information indicating that the UE has the capability to support the uplink TCI state; and transmit, to the base station, uplink information using the uplink transmit beam identified in the downlink signaling.

In some aspects, a non-transitory computer-readable medium may store one or more instructions for wireless communication. The one or more instructions, when executed by one or more processors of a base station, may cause the one or more processors to: receive, from a UE, information indicating that the UE has a capability to support an uplink TCI state; transmit, to the UE, downlink signaling identifying an uplink transmit beam based at least in part on the information indicating that the UE has the capability to support the uplink TCI state; and receive, from the UE, uplink information using an uplink receive beam corresponding to the uplink transmit beam identified in the downlink signaling.

In some aspects, an apparatus for wireless communication may include: means for transmitting, to a base station, information indicating that the apparatus has a capability to support an uplink TCI state; means for receiving, from the base station, downlink signaling identifying an uplink transmit beam based at least in part on the information indicating that the apparatus has the capability to support the uplink TCI state; and means for transmitting, to the base station, uplink information using the uplink transmit beam identified in the downlink signaling.

In some aspects, an apparatus for wireless communication may include: means for receiving, from a UE, information indicating that the UE has a capability to support an uplink TCI state; means for transmitting, to the UE, downlink signaling identifying an uplink transmit beam based at least in part on the information indicating that the UE has the capability to support the uplink TCI state; and means for receiving, from the UE, uplink information using an uplink receive beam corresponding to the uplink transmit beam identified in the downlink signaling.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
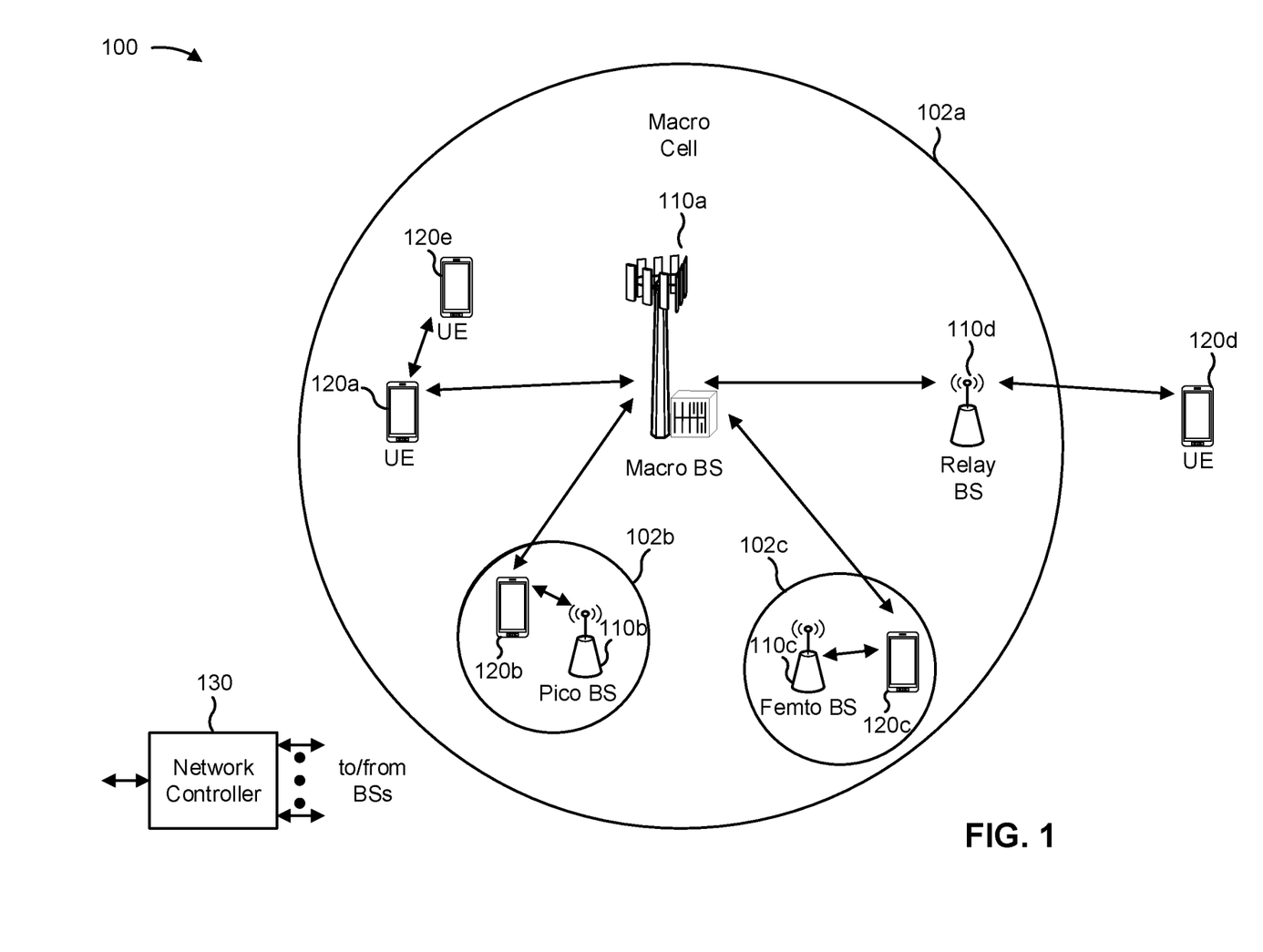
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced.

The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
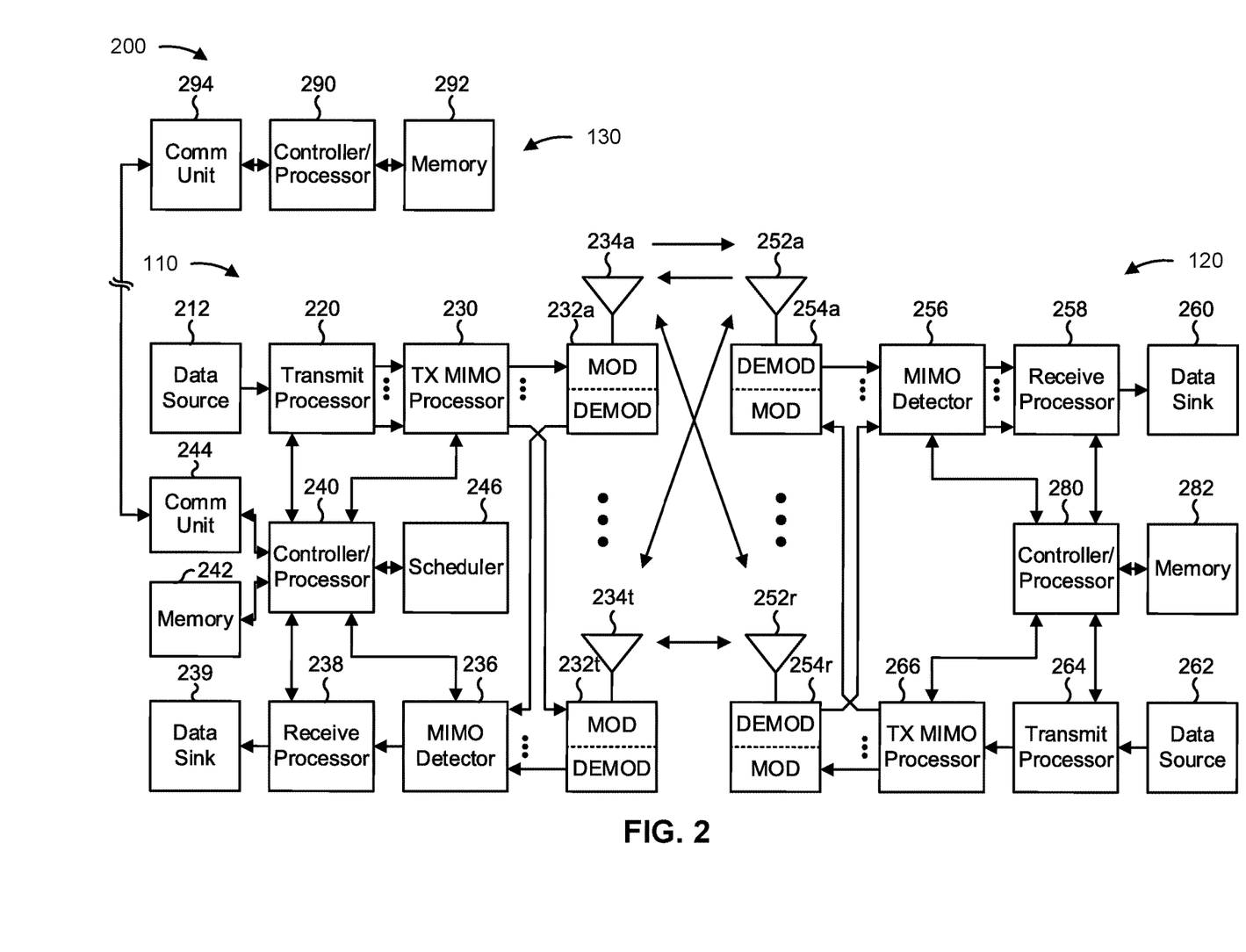
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a UE indication for uplink transmission configuration indication (TCI) state and spatial relation information, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for transmitting, to base station 110, information indicating that UE 120 has a capability to support an uplink TCI state, means for receiving, from base station 110, downlink signaling identifying an uplink transmit beam based at least in part on the information indicating that UE 120 has the capability to support the uplink TCI state, means for transmitting, to base station 110, uplink information using the uplink transmit beam identified in the downlink signaling, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from UE 120, information indicating that UE 120 has a capability to support an uplink TCI state, means for transmitting, to UE 120, downlink signaling identifying an uplink transmit beam based at least in part on the information indicating that UE 120 has the capability to support the uplink TCI state, means for receiving, from UE 120, uplink information using an uplink receive beam corresponding to the uplink transmit beam identified in the downlink signaling, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Wireless communication devices, such as UEs, base stations, transmit-receive points (TRPs), and/or the like, may communicate with each other using beams. For example, in some cases, a downlink transmission configuration indicator (TCI) state may define a beam according to a downlink transmit beam to be used by a base station, a TRP, and/or the like and a corresponding downlink receive beam to be used by a UE. In general, a downlink TCI state may indicate a source reference signal and a quasi-co-location (QCL) type to be used for the corresponding beam. For example, the QCL type may correspond to one or more QCL relationships that indicate how the source reference signal is to be quasi-co-located (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, a spatial receive parameter, and/or the like. Accordingly, properties of the beam can generally be derived from the properties of the source reference signal.

Furthermore, on an uplink, a beam is typically defined according to an uplink spatial relation information (SRI) that indicates a spatial domain transmission filter to be used by a UE for a corresponding uplink communication. Accordingly, in this case, the uplink SRI may indicate an uplink transmit beam to be used by a UE and a corresponding uplink receive beam to be used by a base station, a TRP, and/or the like. Additionally, or alternatively, an uplink TCI state may be defined for beamformed uplink communications to enable a unified TCI framework for downlink and uplink communications. In such cases, each valid uplink TCI state configuration may contain a source reference signal to indicate an uplink transmit beam for a target uplink communication (e.g., a target uplink reference signal or a target uplink channel). For example, the source reference signal may be a sounding reference signal (SRS), a synchronization signal block (SSB), a channel state information reference signal (CSI-RS), and/or the like, and the target uplink communication may be a physical random access channel (PRACH), a physical uplink control channel (PUCCH), a physical uplink shared channel (PUSCH), an SRS, a demodulation reference signal (DMRS) (e.g., a DMRS for a PUCCH or a PUSCH), and/or the like.

Accordingly, in cases where a UE is able to communicate with a base station, a TRP, and/or the like on an uplink using an uplink TCI state, configuring an uplink transmit beam according to SRI may be a legacy uplink beamforming configuration. This may introduce uncertainty into the particular techniques that a base station uses to perform uplink beam management. For example, to ensure that legacy UEs are able to use beamforming to communicate on an uplink, a base station may support uplink beam management to configure, activate, deactivate, or otherwise update uplink SRI (e.g., which may include indications of beam and/or base station co-location parameters, QCL parameters, and/or the like), such as PUCCH spatial relations, PUSCH spatial relations, SRS spatial relations, and/or the like. Furthermore, to enable a unified downlink and uplink TCI framework and indicate various uplink QCL relationships (e.g., Doppler shift, Doppler spread, average delay, delay spread, and/or the like), a base station may support uplink beam management using an uplink TCI state (e.g., an uplink TCI state for a PUCCH, an uplink TCI state for a PUSCH, an uplink TCI state for a PRACH, an uplink TCI state for an SRS, and/or the like). However, UEs may not universally support uplink TCI states and/or SRI-based uplink beam indications, which may create challenges for a base station to properly coordinate uplink beam management without knowing the beam update capabilities supported by a UE.

Some aspects described herein relate to techniques and apparatuses whereby a UE may provide signaling to indicate, to a base station, that the UE supports beamformed communication on an uplink using an uplink TCI state. Furthermore, in some aspects, the signaling may implicitly or explicitly indicate whether the UE also supports SRI-based uplink beam management. In this way, the base station may determine the particular uplink beam management techniques supported by the UE and perform uplink beam management using the appropriate technique(s). For example, in cases where the UE supports uplink communication using an uplink TCI state and does not support uplink communication using SRI, the base station may perform uplink beam management according to uplink TCI states. Alternatively, in cases where the UE supports uplink communication using an uplink TCI state and also supports uplink communication using SRI, the base station may provide signaling to the UE to indicate which technique is to be used to manage an uplink transmit beam to be used by the UE. For example, the base station may configure a flag in radio resource control (RRC) signaling to indicate whether the uplink transmit beam is to be managed using an uplink TCI state or SRI, and subsequent downlink signaling from the base station to the UE may provide updated information for the uplink transmit beam based on the RRC flag. In this way, the indication from the UE may enable the base station to perform uplink beam management according to the particular uplink beamforming capabilities supported by the UE.

Figure 3:
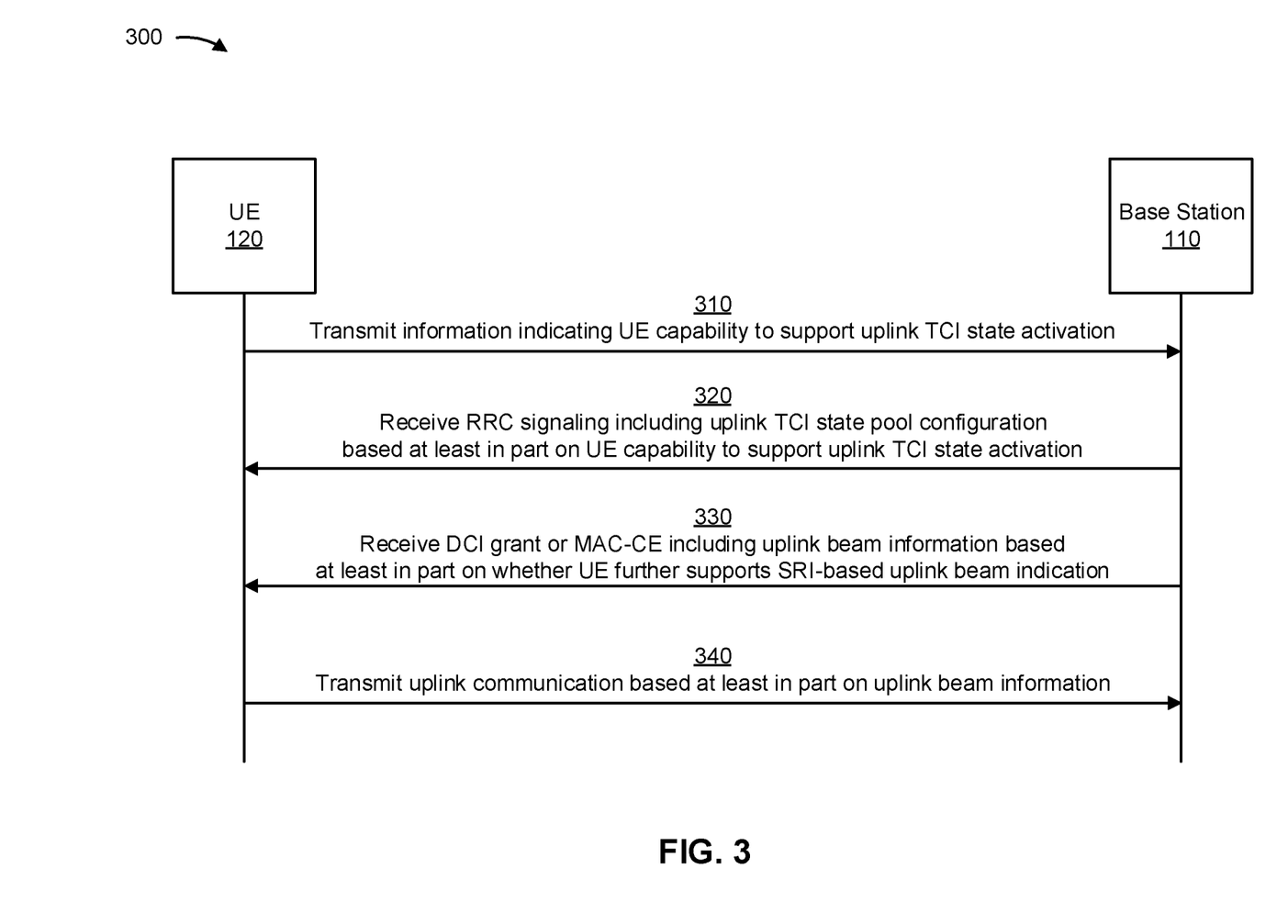
FIG. 3 is a diagram illustrating one or more examples of UE indication for uplink transmission configuration indication (TCI) state and spatial relation information, in accordance with various aspects of the present disclosure.

FIG. 3 is a diagram illustrating one or more examples 300 of a UE indication for uplink TCI state and spatial relation information, in accordance with various aspects of the present disclosure. As shown in FIG. 3, example(s) 300 include a UE 120 in communication with a base station 110 over a wireless network (e.g., wireless network 100). In some aspects, as described herein, the UE 120 and the base station 110 may communicate on an uplink using beamformed communications. For example, the UE 120 may use an uplink transmit beam when transmitting an uplink communication, and the base station 110 may use an uplink receive beam corresponding to the uplink transmit beam to receive the uplink communication. In general, the base station 110 may perform uplink beam management to configure, activate, deactivate, or otherwise update the uplink transmit beam and the corresponding uplink receive beam, and the uplink beam management may be performed using uplink TCI states or SRI. For example, in example(s) 300, the UE 120 may generally support beamformed uplink communication using uplink TCI states, and signaling between the UE 120 and the base station 110 may be used to further indicate whether the UE 120 supports SRI-based uplink beam indications to enable the base station 110 to select the appropriate uplink beam management technique to be used (e.g., uplink TCI states or SRI) for the UE 120.

As shown in FIG. 3, and by reference number 310, the UE 120 may transmit, and the base station 110 may receive, information indicating that the UE 120 has a capability to support uplink TCI state activation. Furthermore, in some aspects, the information indicating that the UE 120 has the capability to support uplink TCI state activation may implicitly or explicitly indicate whether the UE 120 also supports an SRI-based uplink beam indication in addition to uplink TCI state activation. For example, in some cases, the UE 120 may provide an indication related to the support for uplink TCI state activation and may not provide any information related to support for an SRI-based uplink beam indication, which may implicitly indicate that the UE 120 does not support an SRI-based uplink beam indication. Alternatively, in some cases, support for an SRI-based uplink beam indication may be mandatory for a UE 120 that supports beamformed uplink communications (e.g., as a fallback mechanism to ensure compatibility for UEs that support only legacy beamforming techniques). In this case, the information indicating that the UE 120 has the capability to support uplink TCI state activation may be interpreted as an implicit indication that the UE 120 supports both uplink TCI state activation and (legacy) SRI-based uplink beam indication. Additionally, or alternatively, the information indicating that the UE 120 has the capability to support uplink TCI state activation may include an additional explicit indication with regard to whether the UE 120 supports (or lacks support for) an SRI-based uplink beam indication.

As further shown in FIG. 3, and by reference number 320, the base station 110 may transmit, and the UE 120 may receive, RRC signaling including an uplink TCI state pool configuration based at least in part on the capability of the UE 120 to support uplink TCI state activation. The uplink TCI state pool configuration may include information related to various uplink TCI states that may be used for uplink communications between the UE 120 and the base station 110. For example, in some aspects, each uplink TCI state included in the uplink TCI state pool configuration may contain a source reference signal to indicate an uplink transmit beam for a target uplink communication. For example, the source reference signal may include an uplink reference signal (e.g., an SRS) or a downlink reference signal (e.g., an SSB or CSI-RS), and the target uplink communication may include an uplink reference signal (e.g., an SRS), an uplink channel (e.g., a PRACH, PUCCH, or PUSCH), an uplink reference signal for an uplink channel (e.g., a DMRS for a PUCCH or PUSCH), and/or the like.

Furthermore, in cases where the UE 120 supports uplink TCI state activation and also supports an SRI-based uplink beam indication, the RRC signaling may include a flag to indicate whether uplink beam management is to be performed according to uplink TCI states or SRI-based uplink beam indications. For example, when support for SRI-based uplink beam indications is mandatory, the base station 110 may configure the flag in the RRC signaling based at least in part on the UE 120 indicating the support for uplink TCI state activation. Additionally, or alternatively, the base station 110 may configure the flag in the RRC signaling in cases where the UE 120 explicitly indicates that the UE 120 also supports an SRI-based uplink beam indication. In this way, when the UE 120 supports uplink beam management via both uplink TCI states and SRI-based uplink beam indications, the flag provided in the RRC signaling may inform the UE 120 which technique is to be used to manage uplink transmit beams for the UE 120.

As further shown in FIG. 3, and by reference number 330, the base station 110 may transmit, and the UE 120 may receive, downlink signaling (e.g., a downlink control information (DCI) grant or medium access control (MAC) control element (MAC-CE)) that includes uplink beam information based at least in part on whether the UE 120 supports an SRI-based uplink beam indication in addition to uplink TCI state activation. For example, in some aspects, the downlink signaling may generally include information identifying an uplink transmit beam to be used by the UE 120, which may be indicated as an uplink TCI state to be activated in cases where the UE 120 implicitly or explicitly indicates that the UE 120 lacks support for an SRI-based uplink beam indication. Alternatively, in cases where support for the SRI-based uplink beam indication is mandatory or explicitly indicated by the UE 120, the downlink signaling may include a DCI grant or MAC-CE to indicate an uplink TCI state to be activated if the flag provided in the RRC signaling indicated that uplink TCI states are to be used to manage uplink transmit beams for the UE 120. For example, in some aspects, the DCI grant may indicate an uplink TCI state for a scheduled PUSCH transmission, an aperiodic SRS transmission, and/or the like. Additionally, or alternatively, the MAC-CE may indicate an uplink TCI state for a PUCCH transmission, a semi-persistent SRS transmission, a periodic SRS transmission, and/or the like. Alternatively, in cases where support for the SRI-based uplink beam indication is mandatory or explicitly indicated by the UE 120, the downlink signaling may include a DCI grant or MAC-CE to indicate updated SRI to be applied at the UE 120 if the flag provided in the RRC signaling indicated that an SRI-based uplink beam indication is to be used to manage uplink transmit beams for the UE 120.

As further shown in FIG. 3, and by reference number 340, the UE 120 may transmit, and the base station 110 may receive, an uplink communication based at least in part on the uplink beam information indicated in the downlink signaling. For example, in some aspects, the UE 120 may use an uplink transmit beam that is configured based at least in part on an updated uplink TCI state or updated SRI provided in the downlink signaling (e.g., a DCI grant or MAC-CE containing an uplink TCI state activation or updated SRI). Furthermore, as described above, the uplink communication may include an uplink reference signal, an uplink channel, an uplink reference signal for an uplink channel, and/or the like. For example, in some aspects, the uplink communication may include an SRS, a PRACH, a PUCCH, a PUSCH, a DMRS for a PUCCH, a DMRS for a PUSCH, and/or the like.

As indicated above, FIG. 3 is provided as one or more examples. Other examples may differ from what is described with respect to FIG. 3.

Figure 4:
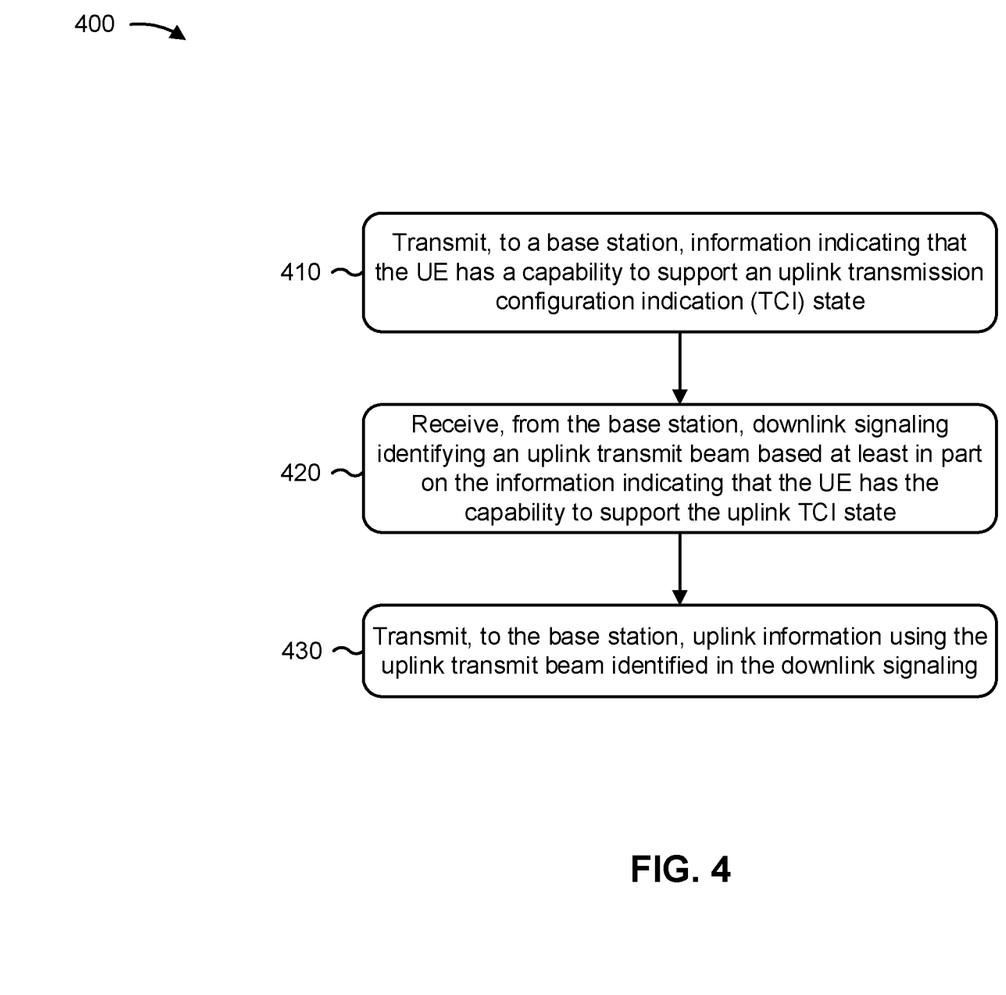
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with indicating support for uplink TCI state and spatial relation information.

As shown in FIG. 4, in some aspects, process 400 may include transmitting, to a base station, information indicating that the UE has a capability to support an uplink TCI state (block 410). For example, the UE may transmit (e.g., using controller/processor 280, transmit processor 264, TX MIMO processor 266, MOD 254, antenna 252, and/or the like), to a base station, information indicating that the UE has a capability to support an uplink TCI state, as described above.

As further shown in FIG. 4, in some aspects, process 400 may include receiving, from the base station, downlink signaling identifying an uplink transmit beam based at least in part on the information indicating that the UE has the capability to support the uplink TCI state (block 420). For example, the UE may receive (e.g., using antenna 252, DEMOD 254, MIMO detector 256, receive processor 258, controller/processor 280, memory 282, and/or the like), from the base station, downlink signaling identifying an uplink transmit beam based at least in part on the information indicating that the UE has the capability to support the uplink TCI state, as described above.

As further shown in FIG. 4, in some aspects, process 400 may include transmitting, to the base station, uplink information using the uplink transmit beam identified in the downlink signaling (block 430). For example, the UE may transmit (e.g., using controller/processor 280, transmit processor 264, TX MIMO processor 266, MOD 254, antenna 252, and/or the like), to the base station, uplink information using the uplink transmit beam identified in the downlink signaling, as described above.

Process 400 may include additional aspects, such as any single aspect or any combination of aspects described below and/or in connection with one or more other processes described elsewhere herein.

In a first aspect, the downlink signaling identifies the uplink transmit beam according to an uplink TCI state to be activated based at least in part on the UE indicating a lack of support for updating the uplink transmit beam using SRI.

In a second aspect, alone or in combination with the first aspect, the information indicating that the UE has the capability to support the uplink TCI state implicitly indicates the lack of support for updating the uplink transmit beam using the SRI.

In a third aspect, alone or in combination with one or more of the first and second aspects, the information indicating that the UE has the capability to support the uplink TCI state explicitly indicates the lack of support for updating the uplink transmit beam using the SRI.

In a fourth aspect, alone or in combination with one or more of the first through third aspects, process 400 includes receiving, from the base station, RRC signaling configuring a pool of uplink TCI states based at least in part on the information indicating that the UE has the capability to support the uplink TCI state.

In a fifth aspect, alone or in combination with one or more of the first through fourth aspects, the RRC signaling includes a flag indicating whether the uplink transmit beam is to be identified according to an uplink TCI state to be activated or updated SRI based at least in part on the UE indicating support for updating the uplink transmit beam using the SRI.

In a sixth aspect, alone or in combination with one or more of the first through fifth aspects, the information indicating that the UE has the capability to support the uplink TCI state explicitly indicates the support for updating the uplink transmit beam using the SRI.

In a seventh aspect, alone or in combination with one or more of the first through sixth aspects, the downlink signaling identifies the uplink transmit beam according to an uplink TCI state to be activated based at least in part on the flag indicating that the uplink transmit beam is to be identified according to an uplink TCI state to be activated.

In an eighth aspect, alone or in combination with one or more of the first through seventh aspects, the downlink signaling identifies the uplink transmit beam according to updated SRI based at least in part on the flag indicating that the uplink transmit beam is to be identified according to updated SRI.

In a ninth aspect, alone or in combination with one or more of the first through eighth aspects, the downlink signaling includes DCI and/or a MAC-CE.

In a tenth aspect, alone or in combination with one or more of the first through ninth aspects, the uplink information transmitted using the uplink transmit beam includes an uplink reference signal or an uplink channel.

In an eleventh aspect, alone or in combination with one or more of the first through tenth aspects, the uplink reference signal includes an SRS or a DMRS for the uplink channel.

In a twelfth aspect, alone or in combination with one or more of the first through eleventh aspects, the uplink channel signal includes a PRACH, a PUCCH, or a PUSCH.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
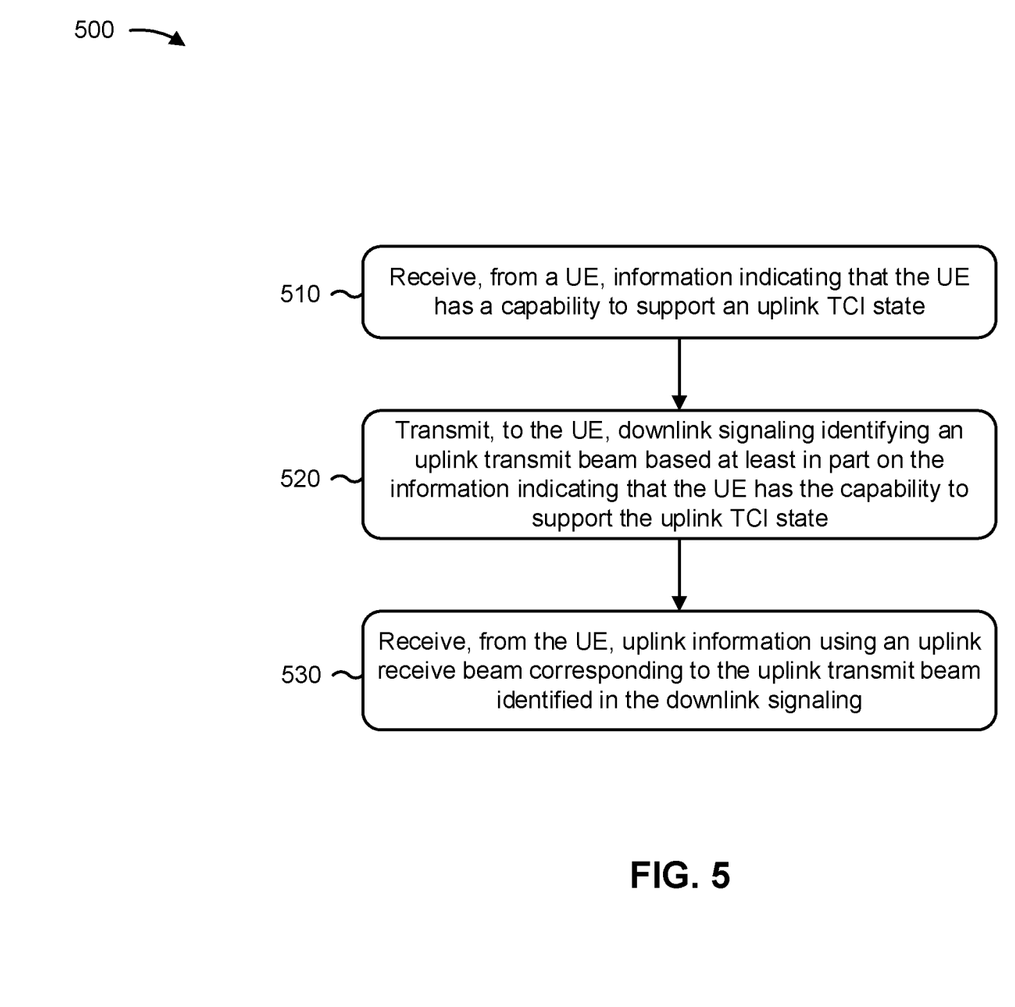
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110 and/or the like) performs operations associated with a UE indicating support for uplink TCI state and spatial relation information.

As shown in FIG. 5, in some aspects, process 500 may include receiving, from a UE, information indicating that the UE has a capability to support an uplink TCI state (block 510). For example, the base station may receive (e.g., using antenna 234, DEMOD 232, MIMO detector 236, receive processor 238, controller/processor 240, and/or the like), from a UE, information indicating that the UE has a capability to support an uplink TCI state, as described above.

As further shown in FIG. 5, in some aspects, process 500 may include transmitting, to the UE, downlink signaling identifying an uplink transmit beam based at least in part on the information indicating that the UE has the capability to support the uplink TCI state (block 520). For example, the base station may transmit (e.g., using controller/processor 240, transmit processor 220, TX MIMO processor 230, MOD 232, antenna 234, and/or the like), to the UE, downlink signaling identifying an uplink transmit beam based at least in part on the information indicating that the UE has the capability to support the uplink TCI state, as described above.

As further shown in FIG. 5, in some aspects, process 500 may include receiving, from the UE, uplink information using an uplink receive beam corresponding to the uplink transmit beam identified in the downlink signaling (block 530). For example, the base station may receive (e.g., using antenna 234, DEMOD 232, MIMO detector 236, receive processor 238, controller/processor 240, and/or the like), from the UE, uplink information using an uplink receive beam corresponding to the uplink transmit beam identified in the downlink signaling, as described above.

Process 500 may include additional aspects, such as any single aspect or any combination of aspects described below and/or in connection with one or more other processes described elsewhere herein.

In a first aspect, the downlink signaling identifies the uplink transmit beam according to an uplink TCI state to be activated based at least in part on the UE indicating a lack of support for updating the uplink transmit beam using SRI.

In a second aspect, alone or in combination with the first aspect, the information indicating that the UE has the capability to support the uplink TCI state implicitly indicates the lack of support for updating the uplink transmit beam using the SRI.

In a third aspect, alone or in combination with one or more of the first and second aspects, the information indicating that the UE has the capability to support the uplink TCI state explicitly indicates the lack of support for updating the uplink transmit beam using the SRI.

In a fourth aspect, alone or in combination with one or more of the first through third aspects, process 500 includes transmitting, to the UE, RRC signaling configuring a pool of uplink TCI states based at least in part on the information indicating that the UE has the capability to support the uplink TCI state.

In a fifth aspect, alone or in combination with one or more of the first through fourth aspects, the RRC signaling includes a flag indicating whether the uplink transmit beam is to be identified according to an uplink TCI state to be activated or updated SRI based at least in part on the UE indicating support for updating the uplink transmit beam using the SRI.

In a sixth aspect, alone or in combination with one or more of the first through fifth aspects, the information indicating that the UE has the capability to support the uplink TCI state explicitly indicates the support for updating the uplink transmit beam using the SRI.

In a seventh aspect, alone or in combination with one or more of the first through sixth aspects, the downlink signaling identifies the uplink transmit beam according to an uplink TCI state to be activated based at least in part on the flag indicating that the uplink transmit beam is to be identified according to an uplink TCI state to be activated.

In an eighth aspect, alone or in combination with one or more of the first through seventh aspects, the downlink signaling identifies the uplink transmit beam according to updated SRI based at least in part on the flag indicating that the uplink transmit beam is to be identified according to updated SRI.

In a ninth aspect, alone or in combination with one or more of the first through eighth aspects, the downlink signaling includes DCI and/or a MAC-CE.

In a tenth aspect, alone or in combination with one or more of the first through ninth aspects, the uplink information transmitted using the uplink transmit beam includes an uplink reference signal or an uplink channel.

In an eleventh aspect, alone or in combination with one or more of the first through tenth aspects, the uplink reference signal includes an SRS or a DMRS for the uplink channel.

In a twelfth aspect, alone or in combination with one or more of the first through eleventh aspects, the uplink channel signal includes a PRACH, a PUCCH, or a PUSCH.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, to a base station, information indicating that the UE has a capability to support an uplink transmission configuration indication (TCI) state;
    receiving, from the base station, downlink signaling identifying an uplink transmit beam based at least in part on the information indicating that the UE has the capability to support the uplink TCI state; and
    transmitting, to the base station, uplink information using the uplink transmit beam, wherein the downlink signaling identifies the uplink transmit beam according to one or more uplink TCI states to be activated based at least in part on the UE indicating a lack of support for updating the uplink transmit beam using spatial relation information (SRI).

2. The method of claim 1, wherein the information indicating that the UE has the capability to support the uplink TCI state implicitly indicates the lack of support for updating the uplink transmit beam using the SRI.

3. The method of claim 1, wherein the information indicating that the UE has the capability to support the uplink TCI state explicitly indicates the lack of support for updating the uplink transmit beam using the SRI.

4. A method of wireless communication performed by a user equipment (UE), comprising:

transmitting, to a base station, information indicating that the UE has a capability to support an uplink transmission configuration indication (TCI) state;

receiving, from the base station, downlink signaling identifying an uplink transmit beam based at least in part on the information indicating that the UE has the capability to support the uplink TCI state; and transmitting, to the base station, uplink information using the uplink transmit beam, wherein the method further comprises:

receiving, from the base station, radio resource control (RRC) signaling configuring a pool of uplink TCI states based at least in part on the information indicating that the UE has the capability to support the uplink TCI state, wherein the RRC signaling includes a flag indicating whether the uplink transmit beam is to be identified according to one or more uplink TCI states to be activated or is to be identified according to updated spatial relation information (SRI) based at least in part on the UE indicating support for updating the uplink transmit beam using the updated SRI.

5. The method of claim 4, wherein the information indicating that the UE has the capability to support the uplink TCI state explicitly indicates the support for updating the uplink transmit beam using the updated SRI.

6. The method of claim 4, wherein the downlink signaling identifies the uplink transmit beam according to the one or more uplink TCI states to be activated based at least in part on the flag indicating that the uplink transmit beam is to be identified according to the one or more uplink TCI states to be activated.

7. The method of claim 4, wherein the downlink signaling identifies the uplink transmit beam according to the updated SRI based at least in part on the flag indicating that the uplink transmit beam is to be identified according to the updated SRI.

8. A user equipment (UE) for wireless communication, comprising: one or more memories; and one or more processors coupled to the one or more memories, the one or more processors configured to cause the UE to:

transmit, to a base station, information indicating that the UE has a capability to support an uplink transmission configuration indication (TCI) state;

receive, from the base station, downlink signaling identifying an uplink transmit beam based at least in part on the information indicating that the UE has the capability to support the uplink TCI state; and transmit, to the base station, uplink information using the uplink transmit beam wherein the downlink signaling identifies the uplink transmit beam according to one or more uplink TCI states to be activated based at least in part on an indication by the UE of a lack of support for updating the uplink transmit beam using spatial relation information (SRI).

9. The UE of claim 8, wherein the information indicating that the UE has the capability to support the uplink TCI state implicitly indicates the lack of support for updating the uplink transmit beam using the SRI.

10. The UE of claim 8, wherein the information indicating that the UE has the capability to support the uplink TCI state explicitly indicates the lack of support for updating the uplink transmit beam using the SRI.

11. A user equipment (UE) for wireless communication, comprising: one or more memories; and one or more processors coupled to the one or more memories, the one or more processors configured to cause the UE to:

transmit, to a base station, information indicating that the UE has a capability to support an uplink transmission configuration indication (TCI) state;

receive, from the base station, downlink signaling identifying an uplink transmit beam based at least in part on the information indicating that the UE has the capability to support the uplink TCI state; and transmit, to the base station, uplink information using the uplink transmit beam, wherein the one or more processors are configured to:

receive, from the base station, radio resource control (RRC) signaling configuring a pool of uplink TCI states based at least in part on the information indicating that the UE has the capability to support the uplink TCI state, wherein the RRC signaling includes a flag indicating whether the uplink transmit beam is to be identified according to one or more uplink TCI states to be activated or is to be identified according to updated spatial relation information (SRI) based at least in part on an indication by the UE of support for updating the uplink transmit beam using the updated SRI.

12. The UE of claim 11, wherein the information indicating that the UE has the capability to support the uplink TCI state explicitly indicates the support for updating the uplink transmit beam using the updated SRI.

13. The UE of claim 11, wherein the downlink signaling identifies the uplink transmit beam according to the one or more uplink TCI states to be activated based at least in part on the flag indicating that the uplink transmit beam is to be identified according to the one or more uplink TCI states to be activated.

14. The UE of claim 11, wherein the downlink signaling identifies the uplink transmit beam according to the updated SRI based at least in part on the flag indicating that the uplink transmit beam is to be identified according to the updated SRI.

* * * * *